United States Patent
Shiraishi

(10) Patent No.: US 12,445,748 B2
(45) Date of Patent: Oct. 14, 2025

(54) IMAGE SIGNAL PROCESSOR AND IMAGING SYSTEM INCLUDING THE SAME

(71) Applicant: SK hynix Inc., Icheon-si (KR)

(72) Inventor: Daisuke Shiraishi, Tokyo (JP)

(73) Assignee: SK hynix Inc., Gyeonggi-do (KR)

(*) Notice: Subject to any disclaimer, the term of this patent is extended or adjusted under 35 U.S.C. 154(b) by 80 days.

(21) Appl. No.: 18/410,244

(22) Filed: Jan. 11, 2024

(65) Prior Publication Data

US 2025/0024171 A1    Jan. 16, 2025

(30) Foreign Application Priority Data

Jul. 14, 2023   (KR) .......................... 10-2023-0091693

(51) Int. Cl.
*H04N 25/72*  (2023.01)
*H04N 25/767* (2023.01)

(52) U.S. Cl.
CPC ........... *H04N 25/72* (2023.01); *H04N 25/767* (2023.01)

(58) Field of Classification Search
CPC ...... H04N 25/72; H04N 25/767; H04N 23/60; H04N 23/80; H04N 25/615; H04N 25/40; H04N 5/772; G06F 13/20; G06T 3/40
See application file for complete search history.

(56) References Cited

U.S. PATENT DOCUMENTS

| | | | |
|---|---|---|---|
| 7,394,465 B2* | 7/2008 | Toni | G09G 5/395 345/531 |
| 8,749,713 B2* | 6/2014 | Han | G09G 5/36 348/715 |
| 11,381,846 B2 | 7/2022 | Ikeda et al. | |
| 2003/0123741 A1* | 7/2003 | Ueno | G06T 1/60 375/E7.189 |
| 2010/0110221 A1* | 5/2010 | Morishita | H04N 1/0402 348/E7.003 |
| 2011/0134265 A1* | 6/2011 | Morishita | H04N 1/0417 348/222.1 |
| 2021/0192690 A1* | 6/2021 | Kang | G06F 1/1641 |
| 2021/0383498 A1 | 12/2021 | Cha et al. | |
| 2023/0100895 A1* | 3/2023 | Huang | G06F 12/08 711/100 |

* cited by examiner

*Primary Examiner* — Chiawei Chen
(74) *Attorney, Agent, or Firm* — WILLIAM PARK AND ASSOCIATES LTD.

(57) ABSTRACT

An imaging system includes a frame memory component configured to perform a read operation or a write operation of image data. The imaging system also includes an image signal processor configured to write the image data input into the frame memory component in a predetermined order, process data read from the frame memory component, and output the processed image data. The image signal processor converts an order of processing the image data to a direction different from a direction in which the image data is input, process the resultant data, aligns the order of the processed image data in the predetermined order, and outputs the resultant data.

20 Claims, 14 Drawing Sheets

IMAGE SIGNAL PROCESSOR AND IMAGING SYSTEM INCLUDING THE SAME

CROSS-REFERENCE TO RELATED APPLICATION

This patent document claims the priority to, and benefits of, Korean patent application No. 10-2023-0091693, filed on Jul. 14, 2023, in the Korean Intellectual Property Office, which is hereby incorporated by reference in its entirety as part of the disclosure of this patent document.

TECHNICAL FIELD

The technology and implementations disclosed in this patent document generally relate to an imaging system capable of generating image data by sensing light.

BACKGROUND

An image sensor is a device for capturing optical images by converting light into electrical signals using a photosensitive semiconductor material which reacts to light. With the development of automotive, medical, computer, and communication industries, the demand for high-performance image sensing devices is increasing in various devices such as smart phones, digital cameras, game machines, IoT (Internet of Things), robots, security cameras, and medical micro cameras.

With the development of image sensing device technology, the volume of data captured by image sensing devices is rapidly increasing. As the volume of image data increases, many more buffers are required to buffer the image data, and the speed of processing the image data may increase. Accordingly, image signal processing technology for reducing not only the number of buffers configured to process image data, but also for increasing the speed of processing the image data is required.

SUMMARY

In accordance with an embodiment of the disclosed technology, an imaging system may include a frame memory component configured to perform a read operation or a write operation of image data. The imaging system may also include an image signal processor configured to write the image data input into the frame memory component in a predetermined order, process data read from the frame memory component, and output the processed image data. The image signal processor may convert an order of processing the image data to a direction different from a direction in which the image data is input, may process the resultant data, may align the order of the processed image data in the predetermined order, and may output the resultant data.

In accordance with an embodiment of the disclosed technology, an image signal processor may include a frame memory component configured to store image data. The image signal processor may also include a buffer circuit configured to write the image data input in the frame memory component in a predetermined order, process data read from the frame memory component, write the processed data in the frame memory component, and output the processed image data read from the frame memory component. When the image data is input in a first direction, the buffer circuit may convert an order of processing the image data in a second direction, may process the resultant data, may align the order of the processed image data in the predetermined order, and may output the resultant data.

In accordance with an embodiment of the disclosed technology, an image signal processor comprising a buffer circuit configured to receive image data in a first orientation direction in which the image data was raster scanned; a frame memory component configured to receive from the buffer circuit and store the image data in the first orientation direction; an image signal processor configured to read the image data in the first orientation direction through the buffer circuit, change the orientation direction of the image data to a second orientation direction different from the first orientation direction, change the processed image data back to the first orientation direction, and output the processed image data in the first orientation direction through the buffer circuit.

BRIEF DESCRIPTION OF THE DRAWINGS

The above and other features and beneficial aspects of the disclosed technology will become readily apparent with reference to the following detailed description when considered in conjunction with the accompanying drawings.

DETAILED DESCRIPTION

Figure 1:
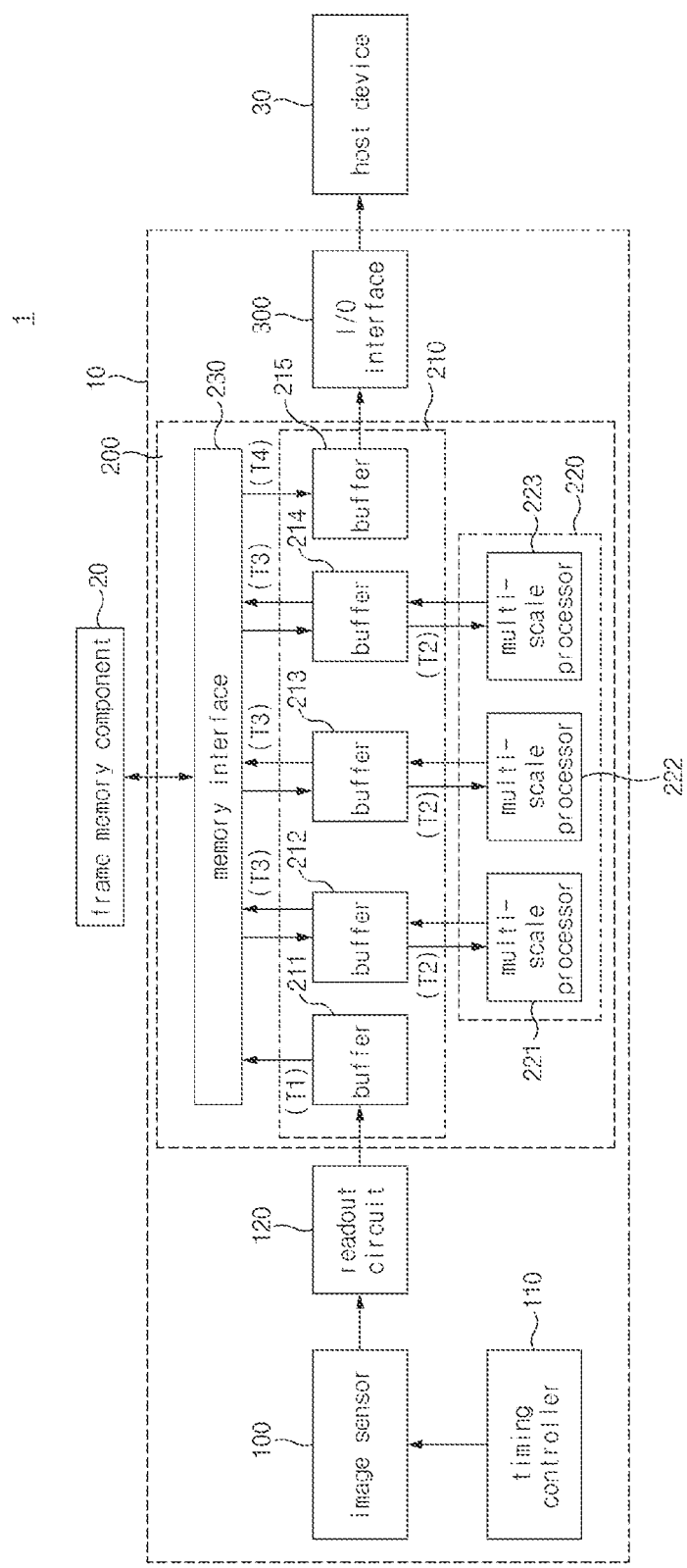
FIG. 1 is a block diagram illustrating an example of an imaging system based on some implementations of the disclosed technology.

This patent document provides implementations and examples of an imaging system capable of generating image data by sensing light that may be used in configurations to substantially address one or more technical or engineering issues and to mitigate limitations or disadvantages encountered in some imaging systems in the art. Some implementations of the disclosed technology relate to an imaging system capable of reducing the size of a buffer of an image signal processor and reducing the data processing time of the image signal processor. In recognition of the issues above, an imaging system based on some implementations of the disclosed technology can reduce the size of a buffer of the image signal processor and reduce the data processing time of the image signal processor.

Reference will now be made in detail to some embodiments of the disclosed technology, examples of which are illustrated in the accompanying drawings. Wherever possible, the same reference numbers will be used throughout the drawings to refer to the same or like parts. While the disclosure is susceptible to various modifications and alternative forms, specific embodiments thereof are shown by way of example in the drawings. However, the disclosure should not be construed as being limited to the embodiments set forth herein.

Hereafter, various embodiments are described with reference to the accompanying drawings. However, it should be understood that the disclosed technology is not limited to specific embodiments, but includes various modifications, equivalents, and/or alternatives of the embodiments. The embodiments of the disclosed technology may provide a variety of effects capable of being directly or indirectly recognized through the disclosed technology.

It is to be understood that both the foregoing general description and the following detailed description of the disclosed technology are illustrative and explanatory and are intended to provide further explanation of the disclosure as claimed. Various embodiments of the disclosed technology relate to an imaging system capable of reducing the size of a buffer of an image signal processor and the data processing time of the image signal processor.

FIG. 1 is a block diagram illustrating an example of an imaging system 1 based on some implementations of the disclosed technology.

Referring to FIG. 1, the imaging system 1 may refer to a device, for example, a digital still camera for photographing still images or a digital video camera for photographing moving images. For example, an imaging device 10 may be implemented as a Digital Single Lens Reflex (DSLR) camera, a mirrorless camera, or a smartphone, and others. The imaging device 10 may include a device having both a lens and an image pickup element such that the device can capture (or photograph) a target object and can thus create an image of the target object.

The imaging system 1 may include the imaging device 10, a frame memory component 20 including frame memory, and a host device 30.

Here, the imaging device 10 may include an image sensor 100, a timing controller 110, a readout circuit 120, an image signal processor 200, and an input/output (I/O) interface 300.

The image sensor 100 may be or include a complementary metal oxide semiconductor image sensor (CIS) for converting an optical signal into an electrical signal. The image sensor 100 may control overall operations such as on/off, operation mode, operation timing, sensitivity, etc. by the timing controller 110. The image sensor 100 may provide the readout circuit 120 with image data obtained by converting the optical signal into the electrical signal under control of the timing controller 110.

The timing controller 110 may provide the image sensor 100 with a clock signal required for the operations of the respective components of the image sensor 100, a control signal for timing control, and address signals for selecting a row or column. In an embodiment of the disclosed technology, the timing controller 110 may include a logic control circuit, a phase lock loop (PLL) circuit, a timing control circuit, a communication interface circuit and others.

The readout circuit 120 may use correlated double sampling (CDS) to remove undesired offset values of pixels known as the fixed pattern noise by sampling a pixel signal twice to remove the difference between these two samples (i.e., a reference signal and an image signal). The readout circuit 120 may include an analog-to-digital converter (ADC) for converting the correlated double sampled (CDS) signal into a digital signal. The readout circuit 120 may include an output buffer that receives image data for each column from the ADC and temporarily holds and outputs the received image data for each column. The readout circuit 120 may include a column driver that selects columns from the output buffer based on a control signal of the timing controller 110 and controls the image data temporarily stored in the selected columns of the output buffer to be sequentially output.

The image signal processor 200 may perform image processing of the image data received from the readout circuit 120. The image signal processor 200 may reduce noise of image data, and may perform various kinds of image signal processing (e.g., gamma correction, color filter array interpolation, color matrix, color correction, color enhancement, lens distortion correction, etc.) for image-quality improvement of the image data. In addition, the image signal processor 200 may compress image data that has been created by execution of image signal processing for image-quality improvement, such that the image signal processor 200 can create an image file using the compressed image data. Alternatively, the image signal processor 200 may recover image data from the image file. In this case, the scheme for compressing such image data may be a reversible format or an irreversible format. As a representative example of such a compression format, in the case of using a still image, Joint Photographic Experts Group (JPEG) format, JPEG 2000 format, or the like can be used. In addition, in the case of using moving images, a plurality of frames can be compressed according to Moving Picture Experts Group (MPEG) standards such that moving image files can be created. For example, the image files may be created according to Exchangeable image file format (Exif) standards.

The image signal processor 200 may include a buffer circuit 210, a data processor 220, and a memory interface 230.

Here, the buffer circuit 210 may temporarily store image data received from the readout circuit 120, and may write the image data in the frame memory component 20 through the memory interface 230. In addition, the buffer circuit 210 may read the image data written in the frame memory component 20 through the memory interface 230, may temporarily store the read image data, and may transmit the stored image data to the data processor 220.

The buffer circuit 210 may temporarily store data processed by the data processor 220, and may write the data in the frame memory component 20 through the memory interface 230. In addition, the buffer circuit 210 may read image data written in the frame memory component 20 through the memory interface 230, may temporarily store the read image data, and may transmit the stored image data to the input/output (I/O) interface 300. However, the scope of operations of the buffer circuit 210 is not limited thereto. For example, the buffer circuit 210 may perform a series of operations by temporarily storing and transmitting predetermined data using the readout circuit 120, the data processor 220, the frame memory component 20, the host device 30, and other components. A configuration for transferring data to or receiving data from the buffer circuit 210 is not limited to the constituent elements shown in FIG. 1.

The buffer circuit 210 may include a plurality of buffers (211~215). Each of the plurality of buffers (211~215) may include a flip-flop or volatile memory (e.g., SRAM), but the type of such memory is not limited thereto.

Here, the buffer 211 may be connected between the readout circuit 120 and the memory interface 230. The buffer 211 may perform an operation T1 of storing image data received from the readout circuit 120 in the frame memory component 20 through the memory interface 230. The buffers (212~214) may be connected between the memory interface 230 and the data processor 220. The buffers (212~214) may perform an operation T2 of storing data received from the memory interface 230 and transferring the data to the multi-scale processors (221~223) corresponding to the respective buffers. In addition, the buffers (212~214) may perform an operation T3 of storing the data received from the corresponding multi-scale processors (221~223) and transferring the data to the memory interface 230 again. The buffer 215 may be connected between the memory interface 230 and the input/output (I/O) interface 300. The buffer 215 may perform an operation T4 of outputting image data received from the frame memory component 20 to the input/output (I/O) interface 300 through the memory interface 230. More detailed information about the buffer circuit 210 having the above-described constituent elements will be described later.

Also, the data processor 220 may perform multi-scale processing based on the image data received from the buffer circuit 210. The data processor 220 may transfer image data in which multi-scale processing has been performed to the buffer circuit 210. Here, multi-scale processing may mean an operation of processing a plurality of images having different scales by re-adjusting an original image to images having different resolutions through a pre-processing operation. The data processor 220 may include a plurality of multi-scale processors (221~223). The multi-scale processors (221~223) may be connected to correspond to the buffers (212~214). The multi-scale processors (221~223) may process the data received from the frame memory component 20 through the corresponding buffers (212~214), and may transmit the processed data to the buffers (212~214) again. More detailed information about the data processor 220 having the above-described constituent elements will be described later.

The memory interface 230 may perform data interfacing between the frame memory component 20 and the buffer circuit 210. Image data from the buffer circuit 210 may be written into the frame memory component 20 through the memory interface 230. The image data read from the frame memory component 20 may be transferred to the buffer circuit 210 through the memory interface 230.

The image signal processor 200 may transmit the ISP (image signal processed) image data to the input/output (I/O) interface 300. The input/output (I/O) interface 300 may perform communication with the host device 30, and may transmit the ISP image data to the host device 30. In some implementations, the input/output (I/O) interface 300 may be a mobile industry processor interface (MIPI) interface, but is not limited thereto.

The frame memory component 20 may write (i.e., store) image data received from the image signal processor 200, and the image data stored in the frame memory component 20 may be read and transferred to the image signal processor 200. The frame memory component 20 may include volatile memory (e.g., DRAM), but the type of such memory is not limited thereto. The frame memory component may store image data corresponding to frames captured by the pixel array of the image sensor 100 at one time.

Although the embodiment of FIG. 1 discloses the frame memory component 20 being located outside the imaging device 10, the scope or spirit of the disclosed technology is not limited thereto. For example, the frame memory component 20 may be located inside the imaging device 10 or may be located inside the image signal processor 200.

The host device 30 may be a processor (e.g., an application processor) for processing the ISP image data received from the imaging device 10, a memory device (e.g., a device including non-volatile memory) for storing the ISP image data, or a display device (e.g., a device including a liquid crystal display (LCD)) for visually displaying the ISP image data.

Figure 2:
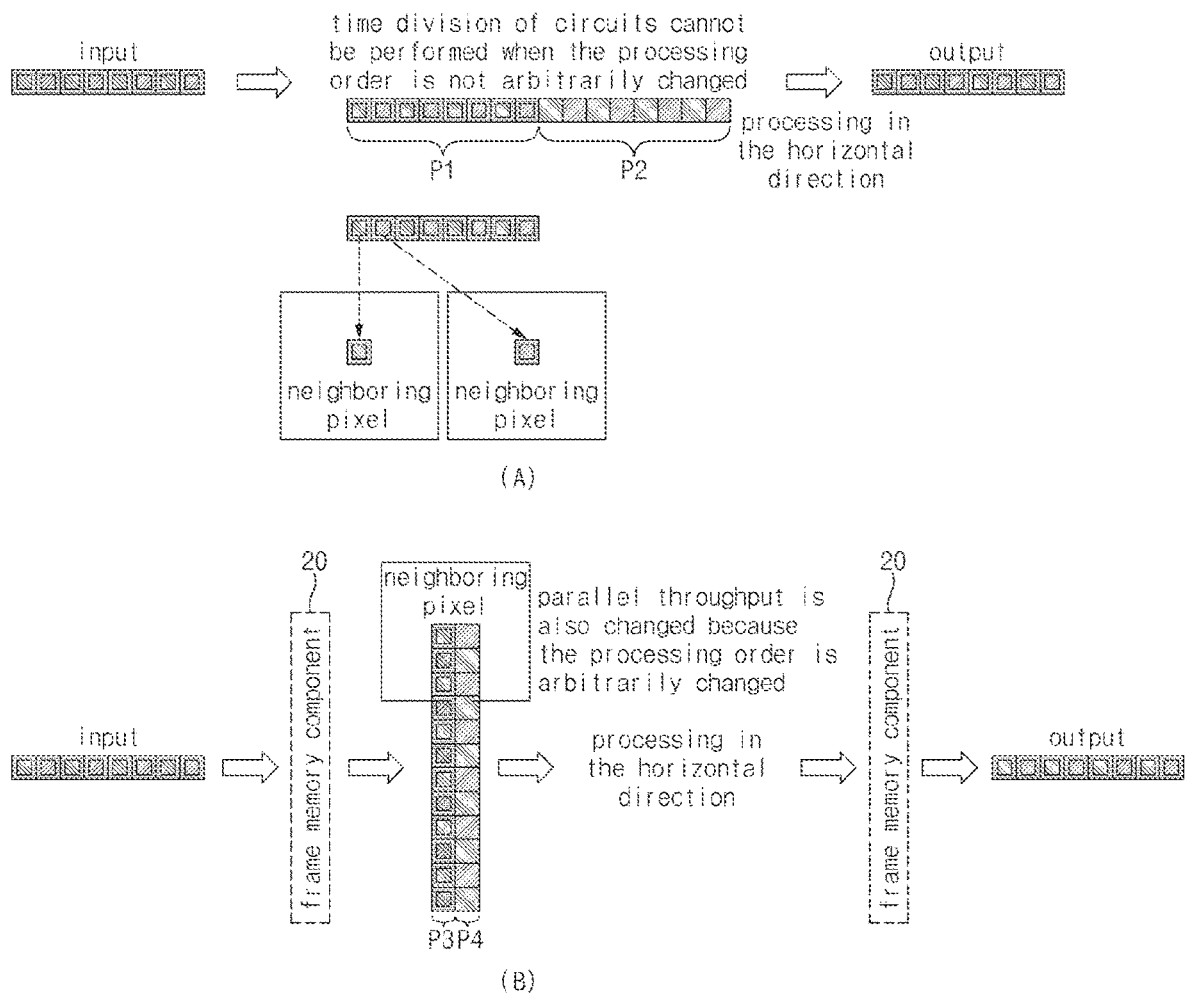
FIG. 2 is a conceptual diagram illustrating an example of operations of an image signal processor shown in FIG. 1 based on some implementations of the disclosed technology.

FIG. 2 is a conceptual diagram illustrating an example of operations of an image signal processor shown in FIG. 1 based on some implementations of the disclosed technology.

The embodiment of FIG. 2 may represent an example of a method for processing data when pixels to be processed are 8 horizontal lanes.

Referring to FIG. 2(A), input image data may be processed for one cycle (i.e., P1 processing), and then the next image data needs to be processed (i.e., P2 processing). In the case of filter processing that requires neighboring pixels, it is necessary to complete calculation of all pixels at the same time. That is, one cycle of throughput is required for processing with a high resolution and a fixed frame rate. To decrease a clock frequency in the image signal processor 200, input of data may be performed at intervals of 8 pixels arranged in a horizontal direction, such that the 8 horizontal pixels should be processed in one cycle. When 8 pixels are processed in parallel with one cycle, the processing speed can be reduced, but 8 identical circuits are required, so that the scale or number of necessary circuits may be increased compared to processing of only one pixel.

Referring to FIG. 2(B), the processing direction of image data may be changed and processed in a vertical parallel direction to be perpendicular to a direction (i.e., a raster scanning direction) in which image data is input. The order of processing pixels may be changed by changing the direction of processing image data to a vertical direction, so that time division processing of parallel data can be performed. Here, time division processing may refer to an operation of processing several input images in a time-division multiplexing (TDM) scheme. The direction of the image data is also referred to as an orientation direction of the image data.

Filtering of pixels to be processed may be performed using data of neighboring pixels from among many pixels included in the image data. Even in the case of filter processing that requires neighboring pixels, one horizontal pixel may be processed in one cycle, such that time division processing of parallel data can be performed.

For example, if the processing order of pixels is arbitrarily changed, the amount of data for performing parallel processing may also be changed, so that data of 8 horizontal lanes may be increased to data of 12 lanes and then processed. Image data may be processed for one cycle (P3 processing), and then processing (i.e., P4 processing) of image data corresponding to parallel data is required.

That is, the image signal processor based on some implementations of the disclosed technology may store input image data in the frame memory component 20, may read the stored image data, may change the order of pixel data in a direction perpendicular to the direction in which the image data is input, and may process the resultant image data. Thereafter, the image signal processor may store the processed pixel data in the frame memory component 20 again, may read the data stored in the frame memory component 20 again, may return the order of pixel data, and may then output the aligned image data.

In some implementations, it is assumed that the image signal processor 200 inputs and outputs image data in a raster scanning order. Here, the raster scanning order may refer to, for example, an operation of sequentially scanning all rows of a plurality of pixels arranged in a left-to-right direction (i.e., a horizontal direction).

However, when the order of processing the pixels is changed in the buffer circuit 210 (e.g., the buffers 211~214 of FIG. 1) as described above, the data processor 220 may select data in the order of any pixels regardless of the raster scanning order. In addition, the buffer circuit 210 (e.g., the buffers 211~214 of FIG. 1) may align the order of pixels in the same order as the order of input pixels, and may output the aligned pixels.

In some implementations, the operation of the buffer circuit 210 will hereinafter be described by taking the operations of T1 to T4 described in FIG. 1 as an example. The buffer 211 may receive data in a horizontal direction during the T1 operation, and may transmit the received data to the memory interface 230. The buffers 212~214 may process data in a vertical direction in a situation where data is received horizontally from the memory interface 230, and may transmit the processed data to the data processor 220 during operation T2. In addition, the buffers 212~214 may process data in a horizontal direction in a situation where data is received vertically from the data processor 220, and may transmit the processed data to the memory interface 230 during operation T3. The buffer 215 may receive data in the horizontal direction during the T4 operation, and may transmit the data to the input/output (I/O) interface 300. The write and read operations of the buffer circuit 210 will be described in detail with reference to FIGS. 7 to 14.

Therefore, to quickly process data using a parallel time division scheme, the data processor 220 located inside the image signal processor 200 may process data in an arbitrary order of pixels, but the order of pixels that are input and output to the image signal processor 200 included in the imaging device 10 may not be changed.

For example, the image signal processor and the imaging system including the same based on some implementations of the disclosed technology can be applied to a device in which a two-dimensional (2D) digital filter having a large number of taps is mounted, but the scope or spirit of the disclosed technology is not limited thereto. For example, the embodiment of the disclosed technology can be applied to the image signal processor that does not use the entire pixels in an operation mode (e.g., a still image mode or a video mode) in which a processing time for each frame is limited, and other implementations are also possible.

When image data has a plurality of lanes in the horizontal direction, overlapping circuits are required to process the image data in the horizontal direction, and it is necessary to simultaneously obtain the results from the respective lanes, such that the number of the overlapping circuits cannot be reduced. However, when image data has a plurality of lanes in the horizontal direction, the image signal processor may process the image data in the vertical direction, or when image data has a plurality of lanes in the vertical direction, the image signal processor may process the image data in the horizontal direction, so that the number of overlapping circuits can be reduced.

Accordingly, the image signal processor based on some implementations of the disclosed technology may process data with a smaller number of buffers than the number of pixels corresponding to the image data. That is, the image signal processor based on some implementations of the disclosed technology can reduce the number of buffers required for data processing and the processing time required to process such data.

Figure 3:
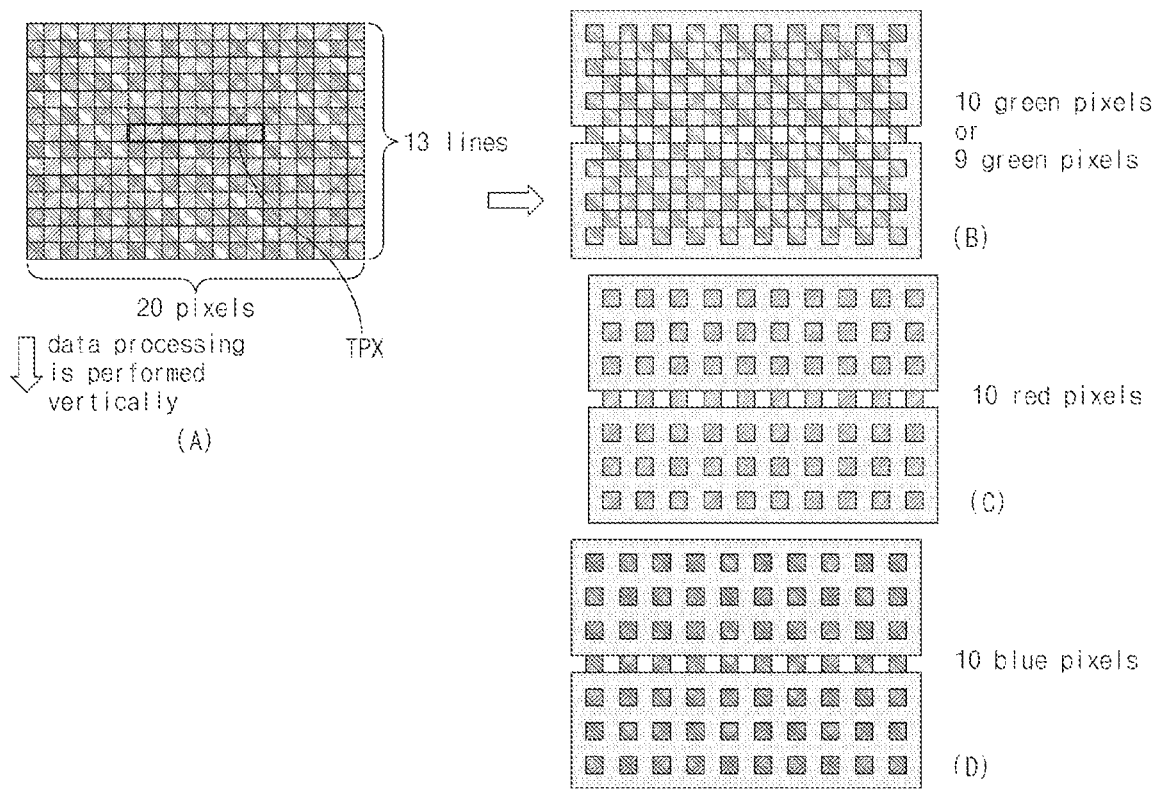
FIG. 3 is a conceptual diagram illustrating an example case in which input of data is vertically performed in the image signal processor shown in FIG. 1 based on some implementations of the disclosed technology.

FIG. 3 is a conceptual diagram illustrating an example case in which input of data is vertically performed in the image signal processor 200 shown in FIG. 1 based on some implementations of the disclosed technology.

Referring to FIG. 3, it is assumed that image data to be processed by the image signal processor 200 has a Bayer pattern as shown in (A). In the embodiment of FIG. 3, when data of 8 lanes arranged in the horizontal direction within a two-dimensional (2D) digital filter is processed, pixels of (20 pixels×13 lines) are required for calculation. Target pixels (TPX) of 8 lanes, which are subject to filtering, may be horizontally included in the seventh line from among a total of 14 lines.

For example, in green pixels as shown in (B), when data is input in the vertical direction, data may be processed using a time division scheme using 10 green pixels or 9 green pixels arranged in the horizontal direction. For example, the image signal processor 200 may repeatedly perform an operation (for example, a pipeline processing operation) of calculating one horizontal line (i.e., 10 green pixels or 9 green pixels) per clock, and may thus perform calculation for 13 lines per 13 clocks.

For example, in red pixels as shown in (C), when data is input in the vertical direction, data may be processed using a time division scheme using 10 red pixels arranged in the horizontal direction. For example, the image signal processor 200 may repeatedly perform an operation (for example, a pipeline processing operation) of calculating one horizontal line (i.e., 10 red pixels) per clock, and may thus perform calculation for 13 lines per 13 clocks.

For example, in blue pixels as shown in (D), when data is input in the vertical direction, data may be processed using a time division scheme using 10 blue pixels arranged in the horizontal direction. For example, the image signal processor 200 may repeatedly perform an operation (for example, a pipeline processing operation) of calculating one horizontal line (i.e., 10 blue pixels) per clock, and may thus perform calculation for 13 lines per 13 clocks.

For example, to simultaneously output data of 8 lanes within a two-dimensional (2D) digital filter, 10 pixels may be calculated in the horizontal direction, and the result of calculation performed after lapse of 13 cycles may be used. For example, it is assumed that there is an operation of squaring the data of each pixel. When the last calculation is performed while leaving data of each pixel, as many buffers (e.g., flip-flops) as the number of delay units may be required. However, when data of each pixel is added or another calculation is required, the number of circuits can be reduced by storing only the calculation result in the buffers without storing all of the calculation results in the buffers.

Figure 4:
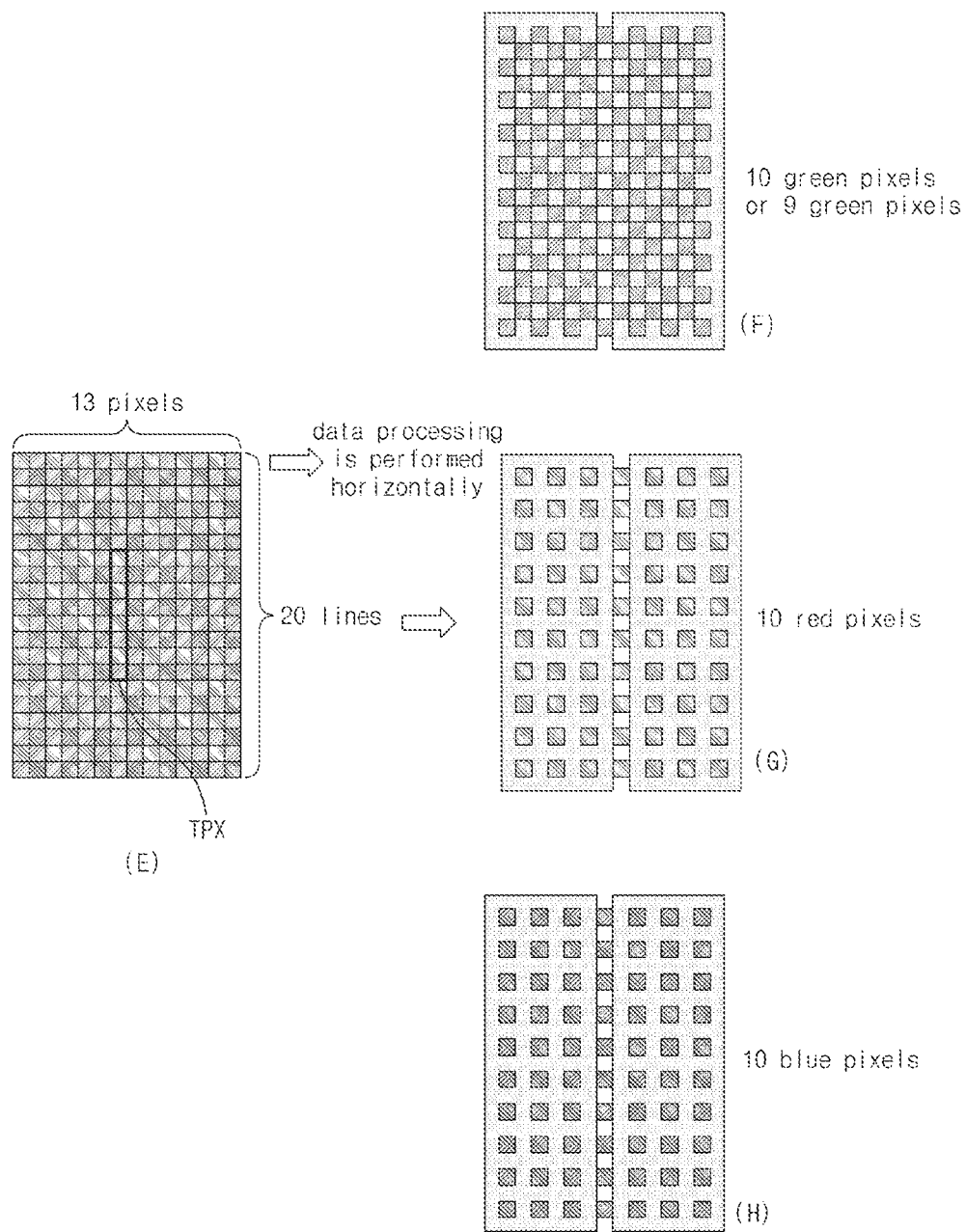
FIG. 4 is a conceptual diagram illustrating an example case in which input of data is horizontally performed in the image signal processor shown in FIG. 1 based on some implementations of the disclosed technology.

FIG. 4 is a conceptual diagram illustrating an example case in which input of data is horizontally performed in the image signal processor 200 shown in FIG. 1 based on some implementations of the disclosed technology.

Referring to FIG. 4, it is assumed that image data to be processed by the image signal processor 200 has a Bayer pattern as shown in (E). In the embodiment of FIG. 4, when data of 8 lanes arranged in the vertical direction within a two-dimensional (2D) digital filter is processed, pixels of (13 pixels×20 lines) are required for calculation. Target pixels (TPX) of 8 lanes, which are subject to filtering, may be vertically included in the seventh pixel from among a total of 14 pixels.

For example, in green pixels as shown in (F), when data is input in the horizontal direction, data may be processed using a time division scheme using 10 green pixels or 9 green pixels arranged in the vertical direction. For example, the image signal processor 200 may repeatedly perform an operation (for example, a pipeline processing operation) of calculating one vertical line (i.e., 10 green pixels or 9 green pixels) per clock, and may thus perform calculation for 13 lines per 13 clocks.

For example, in red pixels as shown in (G), when data is input in the horizontal direction, data processing may be performed using 10 red pixels arranged in the vertical direction. For example, the image signal processor 200 may repeatedly perform an operation (for example, a pipeline processing operation) of calculating one horizontal line (i.e., 10 red pixels) per clock, and may thus perform calculation for 13 lines per 13 clocks.

For example, in blue pixels as shown in (H), when data is input in the horizontal direction, data processing may be performed using 10 blue pixels arranged in the vertical direction. For example, the image signal processor 200 may repeatedly perform an operation (for example, a pipeline processing operation) of calculating one horizontal line (i.e., 10 blue pixels) per clock, and may thus perform calculation for 13 lines per 13 clocks.

For example, to simultaneously output data of 8 lanes within a two-dimensional (2D) digital filter, 10 pixels may be calculated in the vertical direction, and the result of calculation performed after lapse of 13 cycles may be used. Accordingly, the image signal processor may calculate data using a time division scheme in a direction (i.e., a horizontal direction) different from the direction in which target pixels are arranged, such that the image signal processor can reduce the number of circuits required for calculation without changing throughput.

Figure 5:
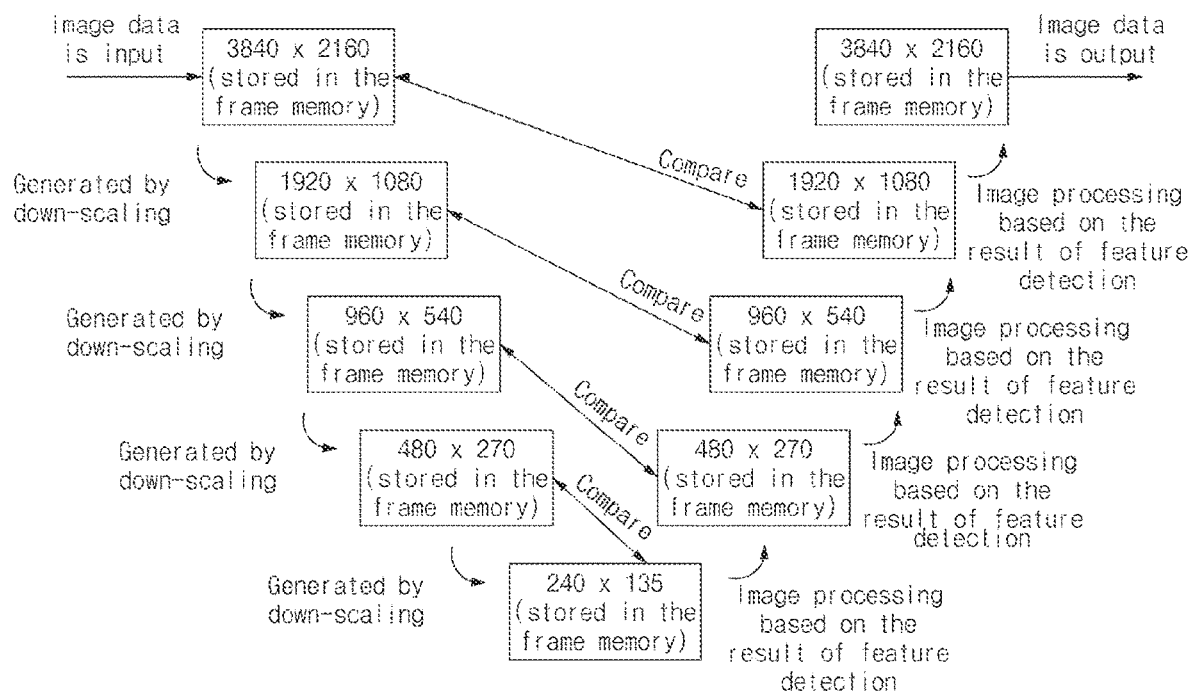
FIG. 5 is a conceptual diagram illustrating an example of operations of a data processor in the image signal processor shown in FIG. 1 based on some implementations of the disclosed technology.

FIG. 5 is a conceptual diagram illustrating an example of operations of a data processor in the image signal processor shown in FIG. 1 based on some implementations of the disclosed technology. Although multi-scale processing from among various processing operations that require frame memories will be described as an example for convenience of description, the scope or spirit of the embodiments of the disclosed technology is not limited thereto.

Referring to FIG. 5, the data processor 220 may perform multi-scale processing on image data written in the frame memory component 20. That is, when image data read from the frame memory component 20 through the buffers 212~214 is input to the data processor 220, the data processor 220 may perform multi-scale processing and may re-write the processed image data in the frame memory component 20 through the buffer 212~214.

For example, each of the plurality of multi-scale processors 221~223 may down-scale input image, so that the plurality of multi-scale processors 221~223 may generate images (each having a half size) having different resolutions, respectively. Here, each of the plurality of multi-scale processors 221~223 may store images generated for each down-scaling in the frame memory component 20.

For example, the multi-scale processors 221~223 may down-scale image data (having the size of 3840×2160) to generate image data (having the size of 1920×1080), and may store the image data having the size of (1920×1080) in the frame memory component 20. In this way, the multi-scale processors 221~223 may down-scale the input image data to a specific size (i.e., a half size), and may store the respective image data (having the size of 960×540, the size of 480×270, the size of 240×135, etc.) having a smaller size than the input image data in the frame memory component 20.

In addition, each of the plurality of multi-scale processors 221~223 may compare the down-scaled images with images each having a previous size, and may thus output the image data processed according to the result of comparison. Here, each of the plurality of multi-scale processors 221~223 may store the processing result for each image in the frame memory component 20. For example, an image processing operation performed by each of the multi-scale processors 221~223 may refer to an operation of performing noise reduction by comparing images having two different sizes with each other.

For example, the multi-scale processors 221~223 may compare the down-scaled image data (having the size of 240×135) with previous image data (having the size of 480×270), and may store the processed image data in the frame memory component 20. In this way, the multi-scale processors 221~223 may compare and process down-scaled image data, and may store the respective image data (having the size of 960×540, the size of 1920×1080, the size of 3840×2160, etc.) having a larger size than the input image data in the frame memory component 20.

Multi-scale processing to be performed by the multi-scale processors 221~223 may be processing capable of performing a common operation on each scale rather than dedicated processing for one scale. In addition, the multi-scale processors 221~223 may be repeatedly used as many times as the number of multi-scales while processing one frame.

Figure 6:
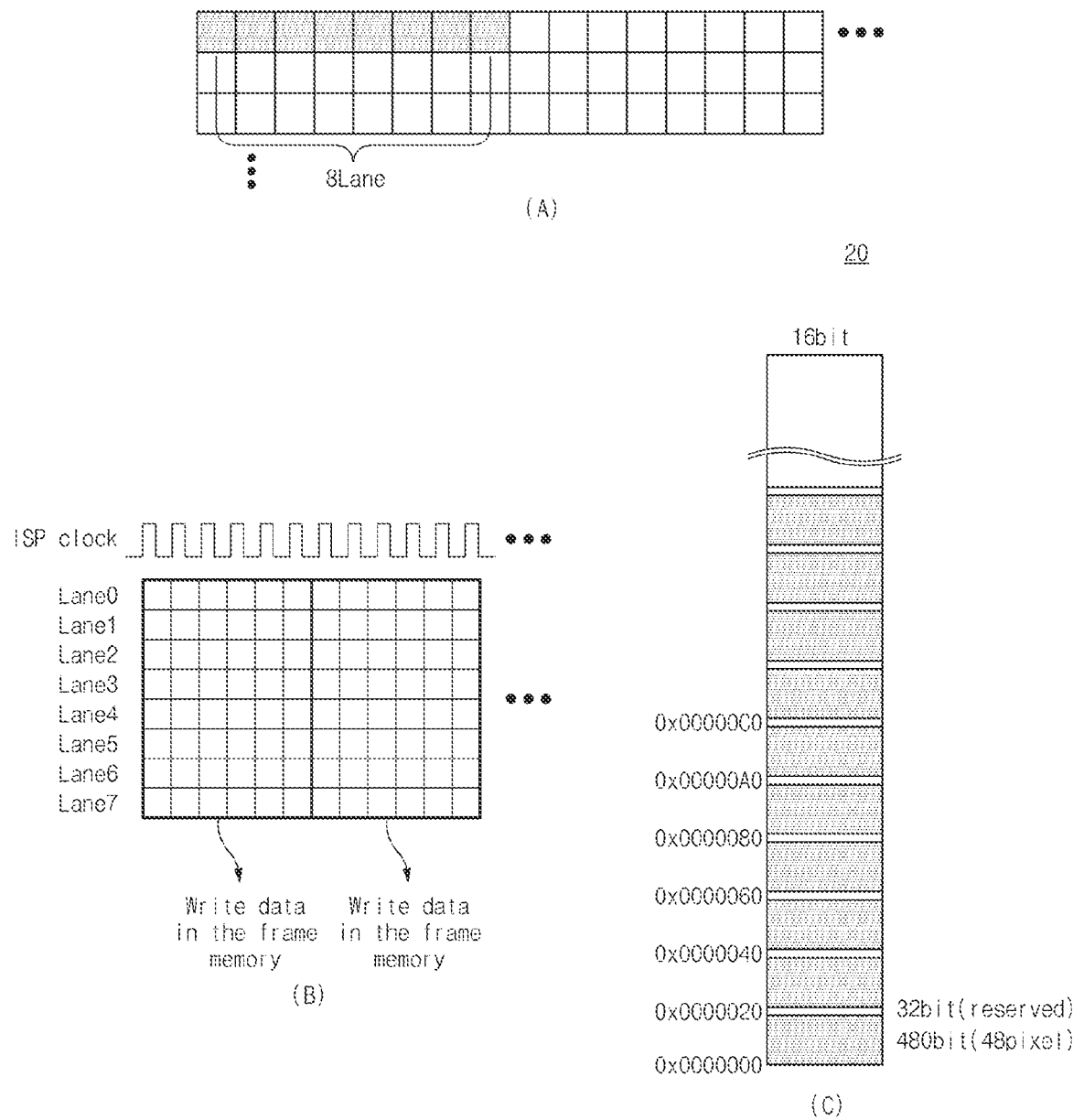
FIG. 6 is a conceptual diagram illustrating an example of access operations of the image signal processor shown in FIG. 1 based on some implementations of the disclosed technology.
Figure 7:
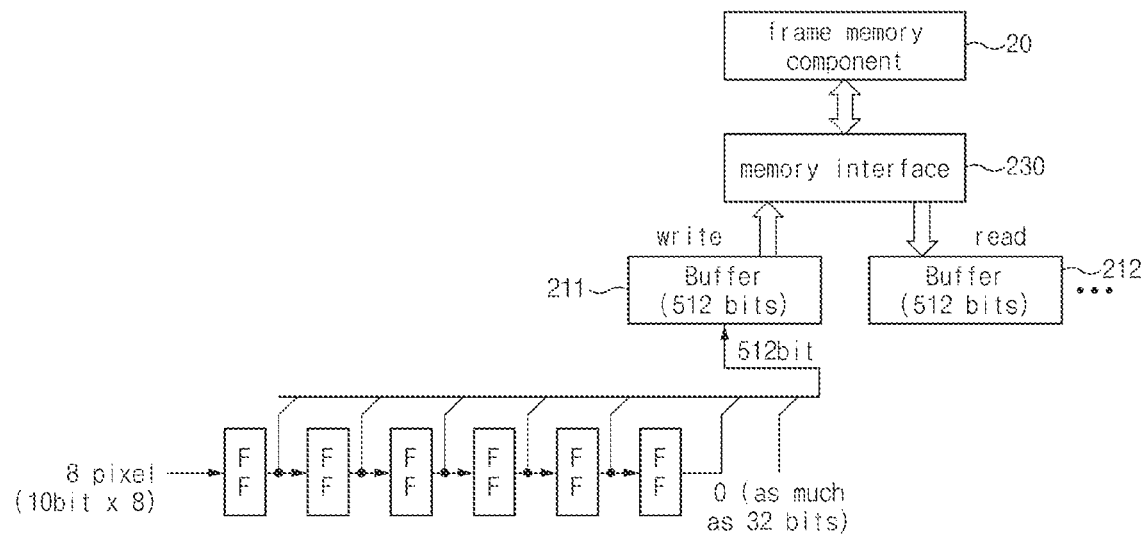
FIGS. 7 and 8 are conceptual diagrams illustrating an example of a write operation of the image signal processor shown in FIG. 1 based on some implementations of the disclosed technology.

FIGS. 6 and 7 are conceptual diagrams illustrating examples of a write operation in the image signal processor 200 of FIG. 1 based on some implementations of the disclosed technology. FIGS. 6 and 7 are conceptual diagrams illustrating examples of an operation (T1) in which the buffer 211 transmits image data received from the readout circuit 120 to the frame memory component 20 through the memory interface 230.

Referring to FIG. 6, image data in units of 8 lanes (hereinafter referred to as '8-lane-based image data') may be transferred from the readout circuit 120 to the buffer 211 as shown in (A). The buffer 211 may transfer the 8-lane-based image data, which is being horizontally received, to the memory interface 230, as shown in (T1) of FIG. 1. Accordingly, image data having the size of (10 bits×8 lanes) may be stored in the frame memory component 20.

For example, as shown in FIG. 6(B), the buffer 211 may align data so that data of 8 lanes (i.e., Lane0 to Lane7) can be written into the frame memory component 20 in a cycle of once per 6 clocks. For example, when the memory interface 230 accesses the frame memory component 20 in units of 512 bits, the buffer 211 may store data of 48 pixels (i.e., 480 bits) in the frame memory component 20 using data of 8 lanes as a cycle of 6 clocks.

FIG. 6(C) may illustrate an example of a storage state of image data in the frame memory component 20. For example, assuming that the width of data stored in the frame memory component is 16 bits, 512 bits corresponding to the size of (16 bits×32 bursts) can be stored during the one access operation. For example, 480 bits from among 512 bits may represent bit values (i.e., 48 pixels) of pixels, and the remaining 32 bits may be used as reserved bits.

Referring to FIG. 7, when image data (i.e., image data in a unit of (10 bits×8 lanes)) is input from the readout circuit 120, the buffer 211 may write data in the frame memory component 20 through the memory interface 230. For example, the buffer 211 may include a plurality of flip-flops (FFs). The buffer 211 may write data of a total of 512 bits in the frame memory component 20 using data of 8 pixels (i.e., data of (10 bits×8 lanes)) as a cycle of 6 clocks.

Figure 8:
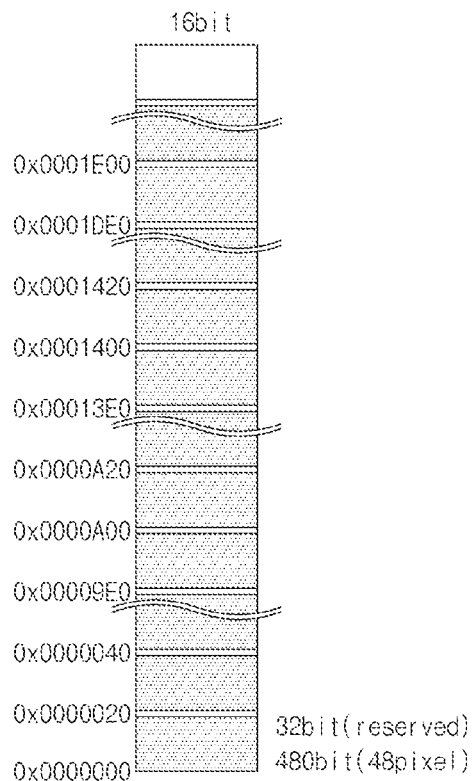
Figure 9:
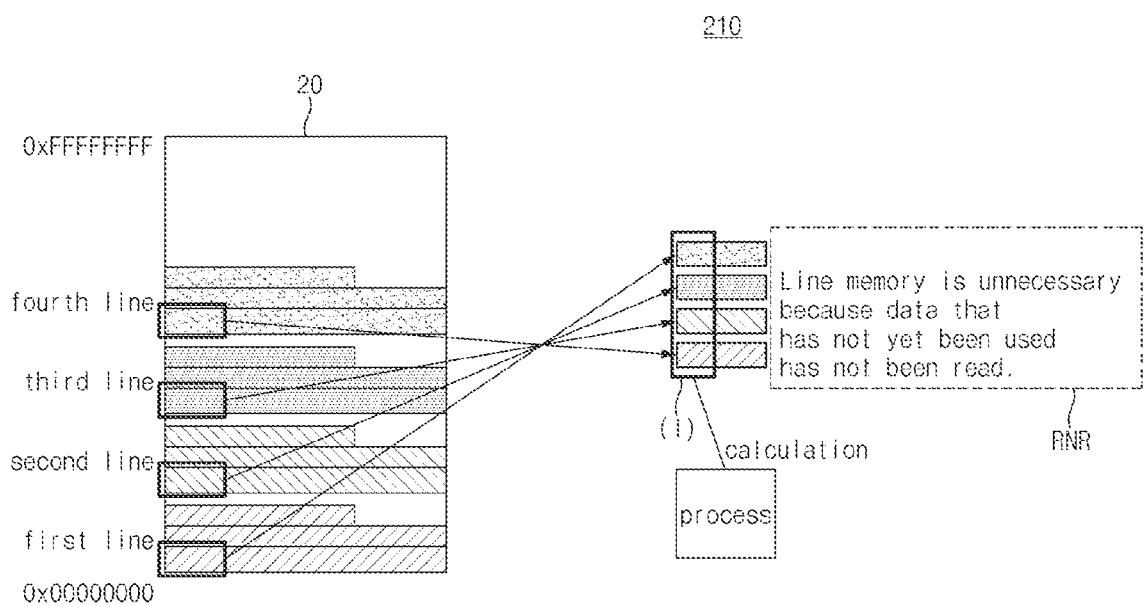
FIGS. 9 to 11 are conceptual diagrams illustrating examples of a read operation of the image signal processor shown in FIG. 1 based on some implementations of the disclosed technology.
Figure 10:
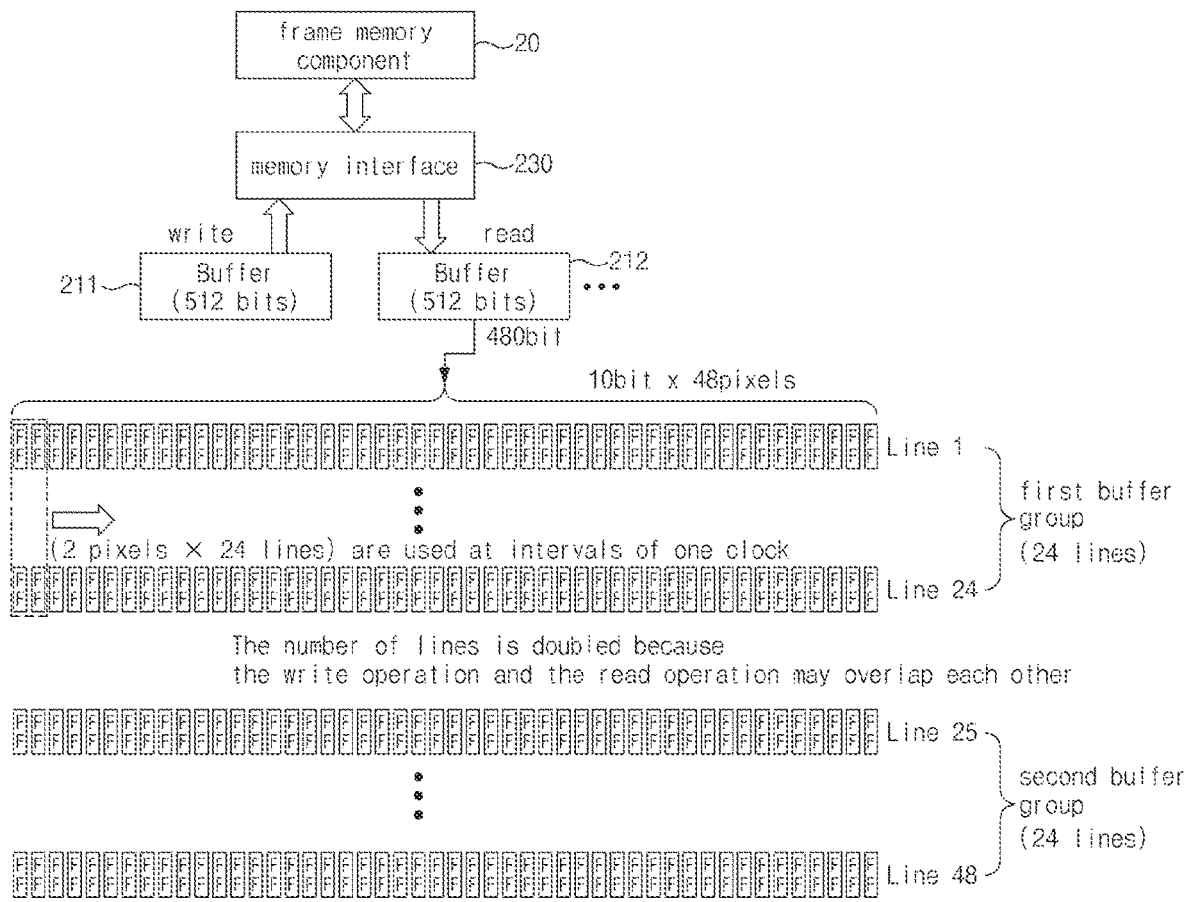

FIGS. 8 to 10 are conceptual diagrams illustrating examples of a read operation in the image signal processor of FIG. 1 based on some implementations of the disclosed technology. FIGS. 8 to 10 are conceptual diagrams illustrating examples of an operation (T2) in which the buffers 212~214 read data from the frame memory component 20 through the memory interface 230.

FIG. 8 illustrates an example of a state in which data (i.e., 480 bits (data of 48 pixels)) corresponding to 1 access is stored in the frame memory component 20. For example, 0x0000 to 0x09FF can be stored as pixel data of a first line (Line 1), 0x0A00 to 0x13FF can be stored as pixel data of a second line (Line 2), 0x1400 to 0x1DFF can be stored as pixel data of a third line (Line 3), and 0x1E00 to 0x27FF can be stored as pixel data of a fourth line (Line 4).

FIG. 9 is a conceptual diagram illustrating an example of an access operation in the image signal processor 200 of FIG. 1. FIG. 9 illustrates an example operation in which data stored in the frame memory component 20 is accessed by the buffers 212~214 as shown in (T2) of FIG. 1. The buffers 211~214 may vertically align data that has been input in the horizontal direction.

When a raster scanning order is limited during access between the frame memory component 20 and the buffer circuit 210, the image signal processor 200 may read data of the frame memory component 20 in a line-by-line manner, and may store the read data in the buffer circuit 210.

However, as shown in FIG. 9, according to some embodiments of the disclosed technology, the buffers 212~214 (e.g., the buffer 212) may change the order of processing the image data, and the data processor 220 may perform data processing in a random order, so that the raster scanning order is not restricted during access between the frame memory component 20 and the buffers 212~214.

The buffers 212~214 may collect some data (I) located at the beginning of each line used for calculation from among data (for example, data of the first to fourth lines) written in the frame memory component 20, and may use the collected data (I) for calculation processing. In addition, because data of a region (RNR) not yet used in the buffers 212~214 is not read, the buffers are not required.

FIG. 10 illustrates an example operation in which data stored in the buffers 212~214 is read as shown in (T2) of FIG. 1. The buffers 212~214 may read image data received from the frame memory component 20 through the memory interface 230, and may transmit the read image data to the data processor 220. For example, the buffers 212~214 may include a plurality of flip-flops (FF). The buffers 212~214 may read data of (10 bits×48 pixels) (i.e., 480 bits). The buffers 212~214 may read data of (2 pixels×24 lanes) at intervals of one clock. The number of lines for use in the buffers 212~214 may be doubled because the write operation and the read operation may overlap each other. That is, each of the buffers 212~214 may include a first buffer group corresponding to lines 1~24 and a second buffer group corresponding to lines 25~48.

The frame memory component 20 may store data in a raster scanning order. However, as described above, the image signal processor based on some implementations of the disclosed technology may process data in parallel in a direction perpendicular to the direction in which data is input. Accordingly, the buffer circuit 210 may include at least one flip-flop (FF) for easy data access. Although the presented embodiment of the disclosed technology has disclosed an example device including flip-flop(s) for convenience of description, the configuration of the buffer circuit 210 is not limited thereto, and it should be noted that the buffer circuit 210 may include SRAM or other volatile memory.

Figure 11:
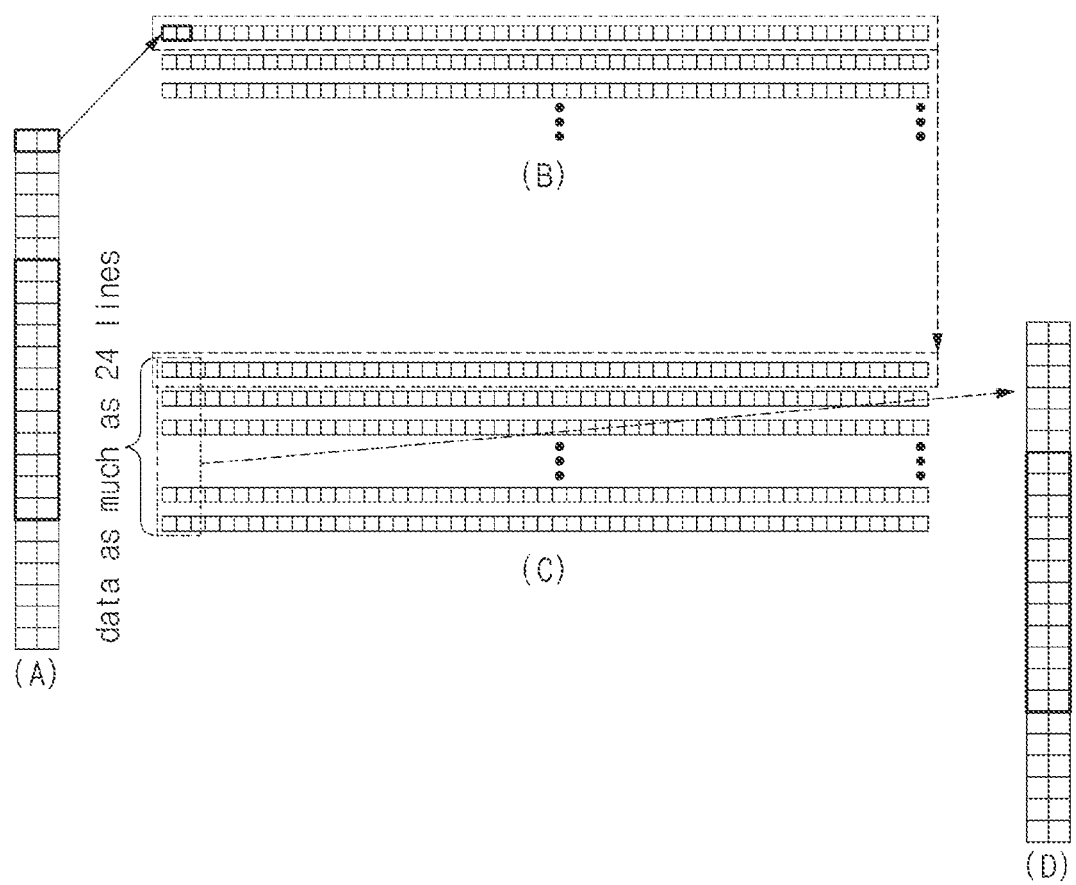

FIG. 11 is a conceptual diagram illustrating an example of a method of performing data alignment processing during a read operation in the image signal processor of FIG. 1. FIG. 11 is a conceptual diagram illustrating an example of an operation (T2) in which the buffers 212~214 receive data from the frame memory component 20 through the memory interface 230 and the received data is then aligned.

As shown in FIG. 11(A), target data to be read may be set by processing pixels (i.e., parallel pixels) having the size of (2×12) within one clock cycle. For example, the data storage capacity for parallel processing may be set to 23,040 bits corresponding to (10 bits×48 pixels×24 lines×2 sides).

FIG. 11(B) illustrates a storage state of the frame memory component 20. For example, 480 bits corresponding to (10 bits×8 lanes×6 cycles) may be stored in a memory region of one line having the size of "48 (horizontal)×1 (vertical)", and can be stored over 24 cycles.

In addition, FIG. 11(C) illustrates an example in which the buffers 212~214 can align data stored in the frame memory component 20. For example, the buffers 212~214 may divide 48 pixels read from the frame memory component 20 into 24 lines, may read the divided data 24 times, and may store the read data.

FIG. 11(D) illustrates the result of completing parallel processing with one clock in the buffers 212~214. The image signal processor based on some implementations of the disclosed technology can perform vertical parallel processing, such that the image signal processor may store as much data as can be obtained with 24 clocks by only one processing.

Figure 12:
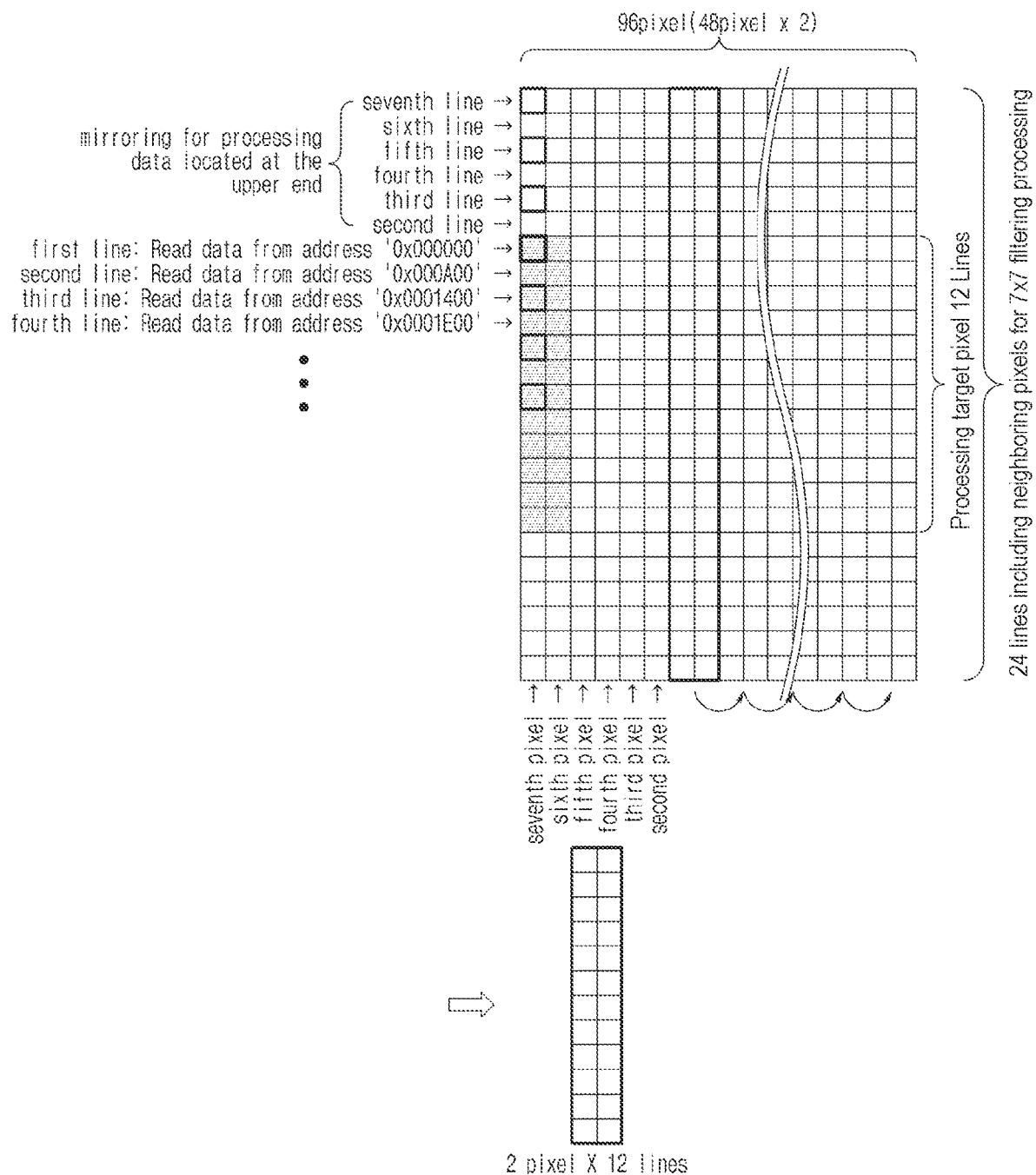
FIGS. 12 and 13 are conceptual diagrams illustrating examples of data alignment processing during read and write operations in the image signal processor shown in FIG. 1 based on some implementations of the disclosed technology.

FIG. 12 is a conceptual diagram illustrating an example operation for processing data during the read operation in the image signal processor of FIG. 1. FIG. 12 is a conceptual diagram illustrating an example of an operation (T2) for allowing the buffers 212~214 to process data and to transmit the processed data to the multi-scale processors 221~223.

FIG. 12 illustrates a pattern having the size of pixels to be processed, which corresponds to pixels having the size of "96 pixels (48 pixels×2) and 12 lines". For (7×7) filtering processing, the image signal processor 200 may mirror some lines of the upper and lower ends, and may read data of 24 lines including not only the pixels to be processed but also the neighboring pixels.

To process data of a plurality of lines, data including pixels located at the left side of each line may be read. For example, the buffers 212~214 may read data from the first line address (0×0000000) of the frame memory component 20, and may read data from the second line address (0×0001400) of the frame memory component 20, so that the buffers 212~214 can finally read data up to the twelfth line.

For example, the embodiment of FIG. 12 may indicate operations of buffers required when (7×7) filtering is performed on image data of a 4K (data having the size of 3840×2160) Bayer array. According to the embodiment of FIG. 12, data that is processed by the buffers 212~214 and output to the multi-scale processors 221~223 may have the size of (2 pixels×12 lines). Accordingly, the multi-scale processors 221~223 may simultaneously process data of (2 pixels×12 lines), may compare the processed result with 8 lanes, and may process the data at a higher processing speed that is three times that of 8 lanes.

Figure 13:
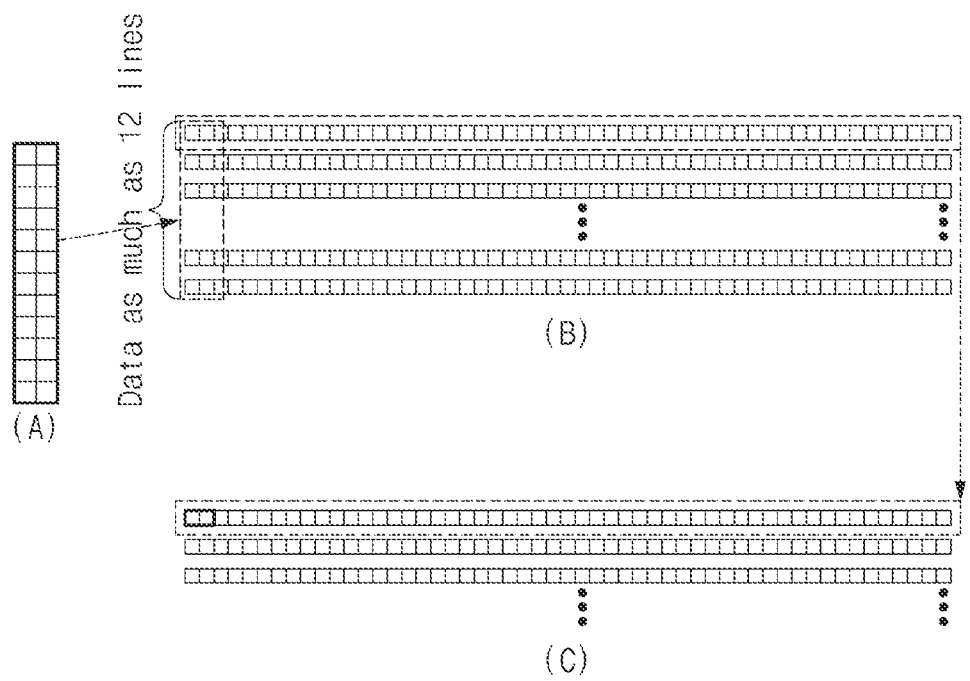

FIG. 13 is a conceptual diagram illustrating an example method for aligning data during the write operation. FIG. 13 is a conceptual diagram for explaining an operation (T3) in which the buffers 212~214 write the processed data received from the multi-scale processors 221~223 in the frame memory component 20 through the memory interface 230.

As shown in FIG. 13(A), target data that was input to the buffer 211 may be transferred to the frame memory component 20 by processing 24 (=2×12) pixels with one clock. For example, the data retention capacity for data alignment processing may be set to 11,520 bits corresponding to (10 bits×48 pixels×12 lines×2 sides).

FIG. 13(B) illustrates an example operation for converting vertical data input to the buffers 212~214 into horizontal data and performing data alignment processing to write data into the frame memory component 20. For example, to process input data with data as much as 12 lines, the buffer circuit 210 may divide the input data into a plurality of data segments each having the size of "2 (=horizontal size)×1 (=vertical size)", and may thus store the resultant data corresponding to 24 cycles. FIG. 13(C) may indicate a storage state of the frame memory component 20. For example, 480 bits corresponding to (10 bits×2 pixels×24 cycles) may be stored over 24 cycles in a memory region of one line having the size of "48 (=horizontal size)×1 (=vertical size)".

Figure 14:
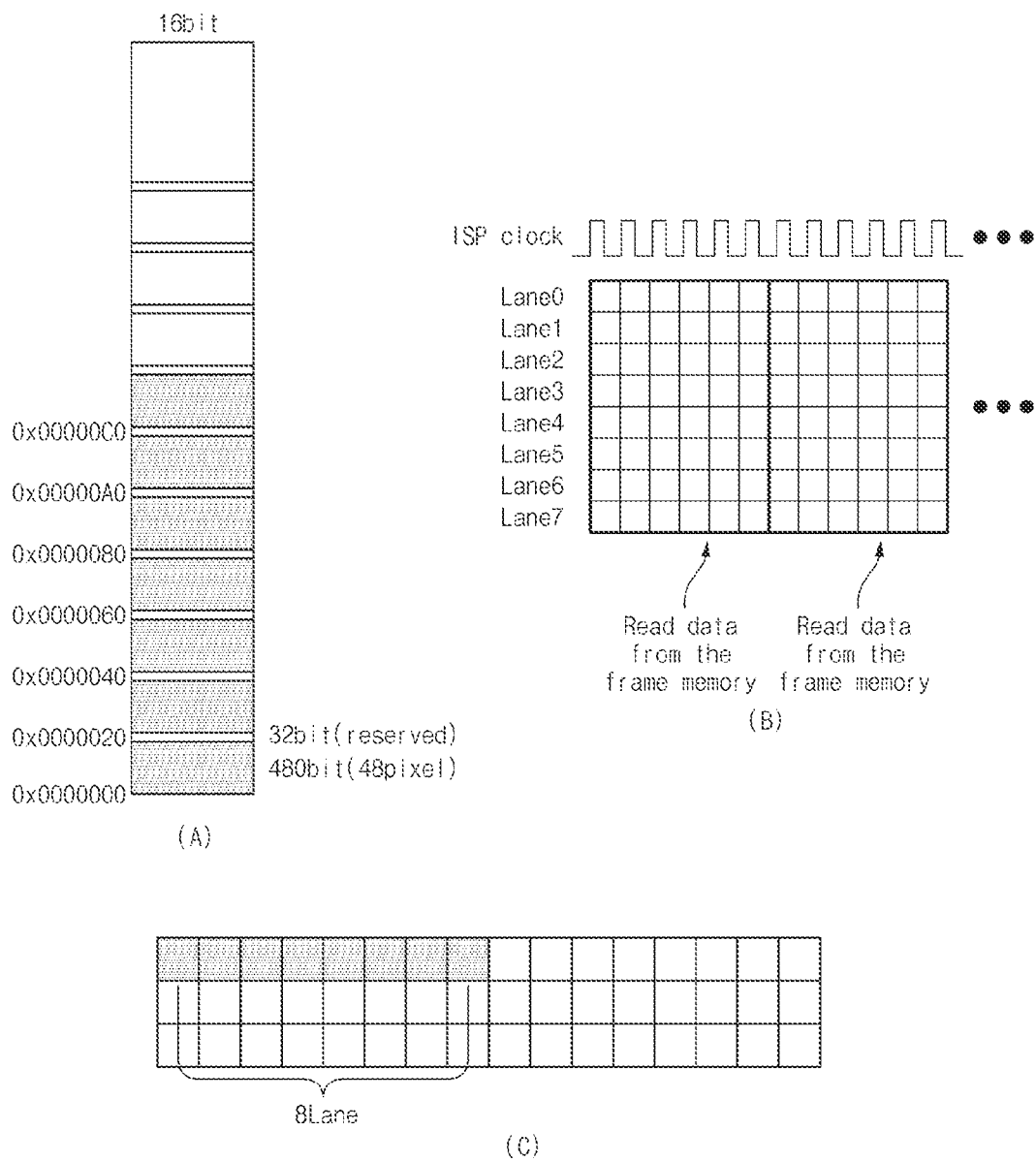
FIG. 14 is a conceptual diagram illustrating an example of operations of accessing output data of a frame memory component shown in FIG. 1 based on some implementations of the disclosed technology.

FIG. 14 is a conceptual diagram illustrating an example of an operation of accessing data output from the frame memory component 20 of FIG. 1. FIG. 14 is a conceptual diagram illustrating an example of an operation (T4) in which the buffer 214 transfers data received from the frame memory component 20 to the I/O interface 300 through the memory interface 230.

FIG. 14 is a diagram for describing an operation (T4') of transferring data applied from a frame memory component (20) to an input/output (I/O) interface (300) through a memory interface (230) in a buffer (215). FIG. 14(A) illustrates an example of a storage state of image data in the frame memory component 20. For example, assuming that the width of data stored in the frame memory component is 16 bits, 512 bits corresponding to (16 bits×32 bursts) may be stored during one access operation. For example, 480 bits from among 512 bits may represent bit values (i.e., 48 pixels) of pixels, and the remaining 32 bits may be used as reserved bits.

As shown in FIG. 14(B), the buffer 215 can read data of 8 lanes (Lane0~Lane7) in a cycle of once per 6 clocks. For example, when the memory interface 230 accesses the frame memory component 20 at intervals of 512 bits, the buffer 215 can read data of 48 pixels (i.e., 480 bits) using data of 8 lanes as a cycle of 6 clocks. As shown in FIG. 14(C), the buffer 215 may sequentially read image data having the size of (10 bits×8 lanes) from the frame memory component 20.

According to presented embodiments of the disclosed technology, the width of data, the number of bits, the size of data, etc. that are used during the read, write, and access operations of data are merely examples for convenience of description and better understanding of the disclosed technology, but are not limited thereto.

As is apparent from the above description, the imaging system including the image signal processor based on some implementations of the disclosed technology can reduce the size of a buffer of the image signal processor and the data processing time of the image signal processor.

Various embodiments of the disclosed technology may provide a variety of effects capable of being directly or indirectly recognized through the above-mentioned patent document.

Although illustrative embodiments have been described, it should be understood that modifications and enhancements to the disclosed embodiments and other embodiments can be devised based on what is described and/or illustrated in this patent document.

What is claimed is:

1. An imaging system comprising:
   a frame memory component configured to perform a read operation or a write operation of image data; and
   an image signal processor configured to write the image data input into the frame memory component in a predetermined order, process data read from the frame memory component, and output the processed image data,
   wherein
   the image signal processor is configured to convert an order of processing the image data to a direction different from a direction in which the image data is input, process the resultant data, align the order of the processed image data in the predetermined order, and output the resultant data.

2. The imaging system according to claim 1, wherein the image signal processor is configured to:
   process the image data in a direction perpendicular to the direction in which the image data is input.

3. The imaging system according to claim 1, further including an input/output (I/O) interface, wherein the image signal processor includes:
   a data processor configured to process the image data; and
   a buffer circuit configured to write the image data in the frame memory component, read data stored in the frame memory component, convert an order of processing the read data into an arbitrary order, transmit the resultant data to the data processor, align an order of the image data processed by the data processor in the predetermined order, write the aligned data in the frame memory component, and output data written in the frame memory component to the input/output (I/O) interface.

4. The imaging system according to claim 3, wherein the image signal processor further includes:
   a memory interface configured to perform communication of the image data between the frame memory component and the buffer circuit.

5. The imaging system according to claim 3, wherein the buffer circuit includes:
   a first buffer configured to transmit the image data to the frame memory component;
   a second buffer configured to convert an order of processing the image data received from the frame memory component into another order, transmit the resultant image data to the data processor, align data processed by the data processor, and transmit the aligned data to the frame memory component; and a third buffer configured to output data stored in the frame memory component.

6. The imaging system according to claim 3, wherein the buffer circuit is configured to:

store only some data from among the data read from the frame memory component in at least one flip-flop, and use the stored data for calculation processing.

7. The imaging system according to claim 3, wherein the data processor includes:

a plurality of multi-scale processors configured to perform multi-scale processing based on the image data.

8. The imaging system according to claim 7, wherein the multi-scale processing includes:

processing a plurality of images having different scales by readjusting the image data to images having different resolutions.

9. The imaging system according to claim 1, wherein:

the predetermined order is a raster scanning order.

10. The imaging system according to claim 1, wherein:

the image signal processor is configured to process, when the number of target pixels to be filtered from among the image data is equal to or greater than a predetermined number, the target pixels using a parallel time division scheme.

11. The imaging system according to claim 10, wherein the image signal processor is configured to:

increase the number of the target pixels more than the number of input pixels; and process the increased target pixels.

12. The imaging system according to claim 10, wherein the image signal processor is configured to:

perform data processing in a vertical direction when the target pixels are arranged in a horizontal direction, wherein the image signal processor is configured to:

perform data processing in a horizontal direction when the target pixels are arranged in a vertical direction.

13. The imaging system according to claim 1, wherein the image signal processor is configured to:

perform data processing in a vertical direction when the image data has a plurality of lanes in a horizontal direction; and perform data processing in a horizontal direction when the image data has a plurality of lanes in a vertical direction.

14. An image signal processor comprising:

a frame memory component configured to store image data; and a buffer circuit configured to write the image data input in the frame memory component in a predetermined order, process data read from the frame memory component, write the processed data in the frame memory component, and output the processed image data read from the frame memory component, wherein the buffer circuit is further configured to:

when the image data is input in a first direction, convert an order of processing the image data in a second direction, process the resultant data, align the order of the processed image data in the predetermined order, and output the resultant data.

15. The image signal processor according to claim 14, wherein:

the first direction and the second direction are perpendicular to each other.

16. The image signal processor according to claim 14, wherein:

the predetermined order is a raster scanning order.

17. The image signal processor according to claim 14, further comprising:

a data processor configured to process image data received from the buffer circuit; and a memory interface configured to perform communication of the image data between the frame memory component and the buffer circuit.

18. The image signal processor according to claim 17, wherein the buffer circuit includes:

a first buffer configured to transmit the image data to the frame memory component;

a second buffer configured to convert an order of processing the image data received from the frame memory component into another order, transmit the resultant image data to the data processor, align data processed by the data processor, and transmit the aligned data to the frame memory component; and a third buffer configured to output data stored in the frame memory component.

19. The image signal processor according to claim 17, wherein the data processor includes:

a plurality of multi-scale processors configured to perform multi-scale processing based on the image data.

20. An image signal processor comprising:

a buffer circuit configured to receive image data in a first orientation direction in which the image data was raster scanned;

a frame memory component configured to receive from the buffer circuit and store the image data in the first orientation direction;

an image signal processor configured to read the image data in the first orientation direction through the buffer circuit, change the orientation direction of the image data to a second orientation direction different from the first orientation direction, change the processed image data back to the first orientation direction, and output the processed image data in the first orientation direction through the buffer circuit.

* * * * *